(12) United States Patent
    Intravatola

(10) Patent No.: US 10,053,124 B2
(45) Date of Patent: Aug. 21, 2018

(54) AIR CYLINDER CART WITH MANIFOLD FOR SUPPLYING ONE OR TWO CONTROL PANELS

(71) Applicant: AIR SYSTEMS, INC., Chesapeake, VA (US)

(72) Inventor: Lawrence Shane Intravatola, Chesapeake, VA (US)

(73) Assignee: AIR SYSTEMS, INC., Chesapeake, VA (US)

( * ) Notice: Subject to any disclaimer, the term of this patent is extended or adjusted under 35 U.S.C. 154(b) by 0 days.

(21) Appl. No.: 15/711,460

(22) Filed: Sep. 21, 2017

(65) Prior Publication Data

US 2018/0079438 A1    Mar. 22, 2018

Related U.S. Application Data

(60) Provisional application No. 62/398,117, filed on Sep. 22, 2016.

(51) Int. Cl.
    *B62B 1/26*     (2006.01)
    *B62B 3/10*     (2006.01)
(52) U.S. Cl.
    CPC ........ *B62B 1/264* (2013.01); *B62B 2202/022* (2013.01)
(58) Field of Classification Search
    CPC .... B62B 2202/022; B62B 1/264; B62B 3/104
    See application file for complete search history.

(56) References Cited

U.S. PATENT DOCUMENTS

| | | | |
|---|---|---|---|
| 2,381,858 | A | 8/1945 | Austin |
| 2,500,989 | A | 3/1950 | Hartley et al. |
| D163,327 | S | 5/1951 | Rose |
| 2,667,397 | A | 1/1954 | Hallisey |
| 2,812,382 | A | 11/1957 | Michael |
| 3,436,093 | A | 4/1969 | Ruffley, Jr. |
| 3,791,403 | A | 2/1974 | Folkerth |
| 3,856,230 | A | 12/1974 | Zimmer |

(Continued)

FOREIGN PATENT DOCUMENTS

| | | |
|---|---|---|
| EP | 0400378 A2 | 12/1990 |
| FR | 2640217 A1 | 6/1990 |

(Continued)

*Primary Examiner* — Bryan A Evans
(74) *Attorney, Agent, or Firm* — Welsh Flaxman & Gitler LLC

(57) ABSTRACT

A gas cylinder cart includes a frame, a first control assembly composed of a first control panel wall and a first gas distribution assembly, a second control assembly composed of a second control panel wall and a second gas distribution assembly, and a central manifold connected to each of the first and second control assemblies. The central manifold includes a valve assembly allowing for connection of both the first and second control assemblies to gas cylinders, connection of only one of the first and second control assemblies to gas cylinders, or connection of the first and/or second control assemblies to remote gas sources. Inclusion of the first and second control assemblies within the gas cylinder cart allows for use of the gas cylinder cart in conjunction with different systems that might require different control assemblies.

12 Claims, 25 Drawing Sheets

(56) References Cited

U.S. PATENT DOCUMENTS

| | | |
|---|---|---|
| 4,098,416 A | 7/1978 | Fawley |
| 4,205,937 A | 6/1980 | Fawley |
| 4,253,716 A | 3/1981 | Turner, Jr. |
| 4,432,470 A | 2/1984 | Sopha |
| 4,457,527 A | 7/1984 | Lowery |
| 4,625,949 A | 12/1986 | Walker |
| 4,753,445 A | 6/1988 | Ferrare |
| D322,352 S | 12/1991 | Hanson |
| 5,071,148 A | 12/1991 | Salvucci, Sr. |
| 5,167,351 A | 12/1992 | Prout et al. |
| 5,307,839 A | 5/1994 | Loebker et al. |
| 5,340,136 A | 8/1994 | MacNeil et al. |
| 5,393,080 A | 2/1995 | Ross |
| 5,396,885 A * | 3/1995 | Nelson .................. A62B 25/00 128/204.18 |
| 5,431,422 A | 7/1995 | Gamache |
| 5,465,987 A | 11/1995 | DellaVecchia |
| 5,570,895 A | 11/1996 | McCue et al. |
| D390,315 S | 2/1998 | Spear et al. |
| D392,081 S | 3/1998 | Salvucci, Sr. |
| D393,127 S | 3/1998 | Vidmar |
| 5,799,958 A | 9/1998 | Bishop |
| 6,019,381 A | 2/2000 | Krawczyk |
| D423,173 S | 4/2000 | Horner et al. |
| 6,047,983 A | 4/2000 | Day, III |
| 6,116,623 A | 9/2000 | Salvucci |
| D443,744 S | 12/2001 | Intravatola |
| 6,733,017 B2 | 5/2004 | Intravatola |
| 7,419,169 B2 | 9/2008 | Intravatola |
| 7,628,407 B1 | 12/2009 | Krowl |
| D640,436 S | 6/2011 | Perelli et al. |
| D770,716 S | 11/2016 | Giampavolo et al. |
| 2003/0052466 A1 * | 3/2003 | Intravatola .............. B62B 1/264 280/79.6 |
| 2013/0106073 A1 | 5/2013 | Gamard et al. |

FOREIGN PATENT DOCUMENTS

| | | |
|---|---|---|
| JP | H05139316 A | 6/1993 |
| WO | WO 93/22176 A1 | 11/1993 |

* cited by examiner

AIR CYLINDER CART WITH MANIFOLD FOR SUPPLYING ONE OR TWO CONTROL PANELS

CROSS REFERENCE TO RELATED APPLICATION

This application claims the benefit of U.S. Provisional Patent Application Ser. No. 62/398,117, entitled "AIR CYLINDER CART WITH MANIFOLD FOR SUPPLYING ONE OR TWO CONTROL PANELS," filed Sep. 22, 2016

BACKGROUND OF THE INVENTION

1. Field of the Invention

The present invention relates generally to a gas cylinder cart, and in particular, to a gas cylinder cart that can have dual control panels that are selectively chosen for use.

2. Description of the Related Art

Gas cylinder carts, and in particular portable gas cylinder carts, are typically used to provide access to various gases, such as air, at remote locations. Such carts are disclosed in Applicant's own U.S. Pat. No. 6,733,017, entitled "GAS CYLINDER CART WITH REMOVABLE CONTROL PANEL" and U.S. Pat. No. 7,419,169, entitled "INTERCHANGEABLE CONTROL PANELS FOR GAS CYLINDER CART."

Fire and rescue personnel use air supply carts to provide an air supply in locations where the ambient air supply may be limited and/or contaminated. In addition, such workers may also have the need for pressurized air to run various pneumatic tools, such as saws and pry devices. In other applications, construction and steel workers use such carts to transport various gas cylinders of welding gases and the like, and entertainers may use such carts to transport tanks of helium and the like.

High quality gas cylinder carts and other breathing air, ventilation and safety equipment are available from Air Systems, Inc., d.b.a. Air Systems International, Inc., 821 Juniper Crescent, Chesapeake, Va., 23320, U.S.A., and are viewable at the website www.airsystems.com. Air Systems, Inc. may also be contacted via telephone at phone number 800-866-8100 or phone number 757-424-3967.

Typically, gas cylinder carts are configured to hold one or more gas cylinders of gas. Often, various pressure gauges, regulators and valves are operably connected to the gas cylinder to allow the operator to control the flow of gas from the gas cylinder to the user, whether for breathing or other uses. In such an embodiment, it can be difficult and time consuming to remove various control devices from the gas cylinder, once emptied, and reattach them to another gas cylinder.

In other known embodiments, various pressure control devices are connected to a control panel, which forms part of the cart as shown, for example, in U.S. Pat. No. 5,570,895. Typically, however, the control panel is fixedly secured or integrated into the cart, such that the cart is provided with only a single configuration or particular arrangement of control devices. Accordingly, the cart cannot be readily reconfigured to accommodate additional control devices, such as additional air ports and/or regulators. Therefore, the users of such carts may be required to keep multiple carts in inventory in order to service their various needs, with an attendant increase in the costs associated with the purchase of additional carts and the storage space required therefor.

The aforementioned U.S. Pat. Nos. 6,733,027 and 7,419,169 disclose an air cylinder cart with a removable control panel. However, the cart controls can only be accessed from one side of the cart, which cannot be easily done in tight space situations, nor can separate air supplies be sent to a particular control without modification of the cart and manifold.

The need for a more flexible cart, particularly for clients that need more than one control panel, has not been met.

SUMMARY OF THE INVENTION

It is, therefore, an object of the present invention to provide a gas cylinder cart including a frame, a first control assembly composed of a first control panel wall and a first gas distribution assembly, a second control assembly composed of a second control panel wall and a second gas distribution assembly, and a central manifold connected to each of the first and second control assemblies. The central manifold includes a valve assembly allowing for connection of both the first and second control assemblies to gas cylinders, connection of only one of the first and second control assemblies to gas cylinders, or connection of the first and/or second control assemblies to remote gas sources. Inclusion of the first and second control assemblies within the gas cylinder cart allows for use of the gas cylinder cart in conjunction with different systems that might require different control assemblies.

It is also an object of the present invention to provide a gas cylinder cart wherein each of the first and second control assemblies includes at least one of a gas control device, a gas monitoring device, a gas inlet port, a gas outlet port, and a gas line.

It is another object of the present invention to provide a gas cylinder cart wherein each first and second control assemblies includes at least one of a manifold for distribution or receipt of gases to or from different ports, a visual warning device, an auditory warning device, and a pressure relief valve.

It is a further object of the present invention to provide a gas cylinder cart wherein the first and second gas distribution assemblies are made of metal.

It is also an object of the present invention to provide a gas cylinder cart wherein the frame includes a pair of opposite side support walls, each having a rear support wall portion and a front support wall portion. A portion of the bottom support wall, the side support walls and the bottom support wall define first and second gas cylinder bays.

It is another object of the present invention to provide a gas cylinder cart wherein each of the first and second control assemblies includes at least one of a gas control device, a gas monitoring device, a gas inlet port, a gas outlet port, and a gas line.

It is a further object of the present invention to provide a gas cylinder cart wherein each first and second control assemblies includes at least one of a manifold for distribution or receipt of gases to or from different ports, a visual warning device, an auditory warning device, and a pressure relief valve.

It is also an object of the present invention to provide a gas cylinder cart wherein a support extends rearward from the rear support wall portion, and an axle with a pair of wheels rotatably mounted thereon is secured to the support.

It is another object of the present invention to provide a gas cylinder cart wherein each of the first and second cylinder bays includes a recess shaped to receive a gas cylinder.

It is further an object of the present invention to provide a gas cylinder cart wherein the frame comprises a central manifold tower centered between the side support walls.

It is also an object of the present invention to provide a gas cylinder cart wherein the central manifold tower includes the first and second control panel walls, as well as first and second tower side walls respectively extending between the first and second control panel walls.

It is another object of the present invention to provide a gas cylinder cart wherein each of the first and second tower side walls includes a curved portion having a concave surface that corresponds to and is shaped to mate with a gas cylinder when it is positioned within either the first or second gas cylinder bay.

It is a further object of the present invention to provide a gas cylinder cart wherein the first control panel wall includes an exposed surface, an interior surface, a top edge, and a bottom edge, and the second control panel wall includes an exposed surface, an interior surface, a top edge, and a bottom edge.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one of ordinary skill in the art how to make and/or use the invention.

Figure 1:
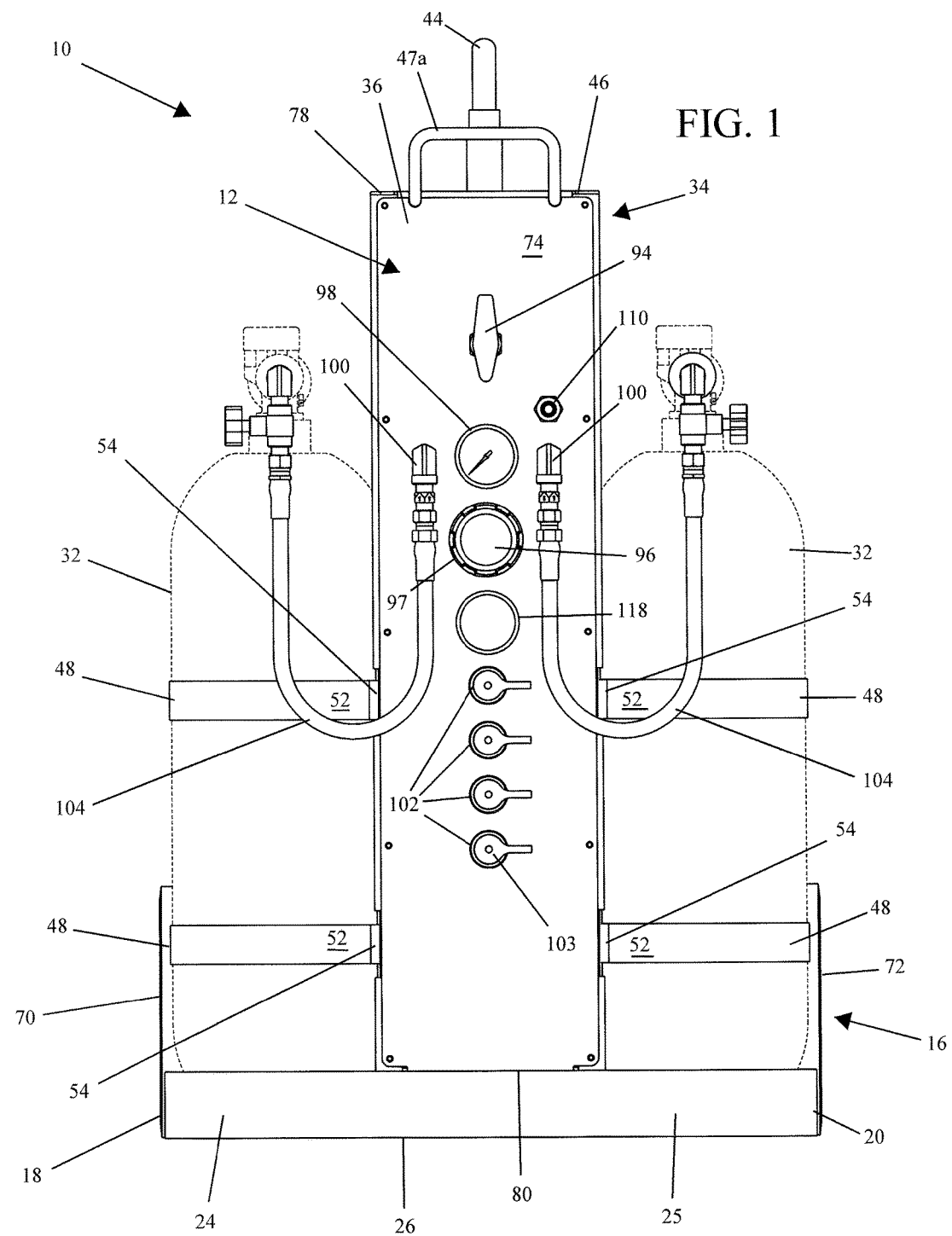
FIG. 1 is a front view of the present air cylinder cart with gas cylinders mounted therein.
Figure 2:
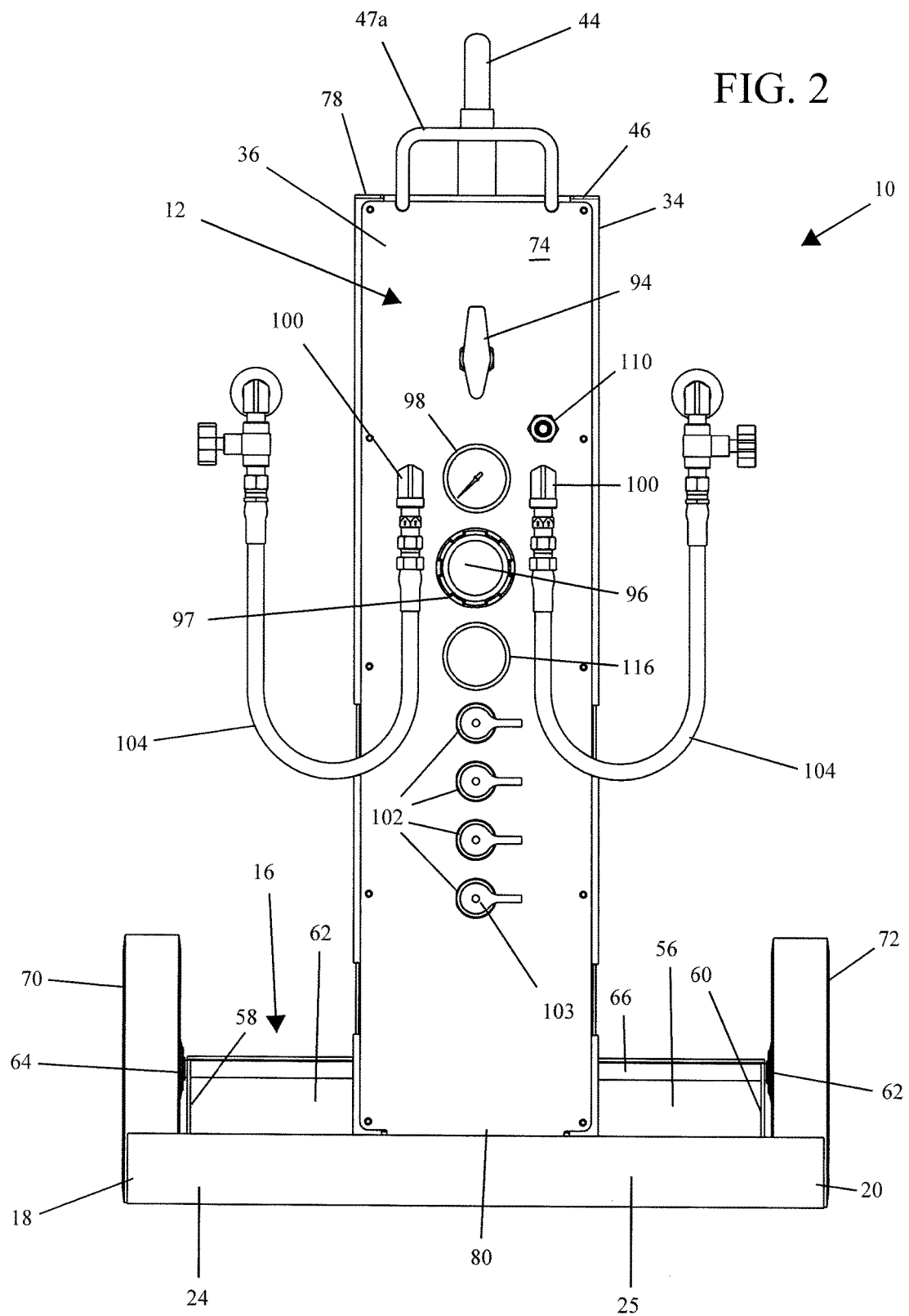
FIG. 2 is a front view of the air cylinder cart without gas cylinders.
Figure 3:
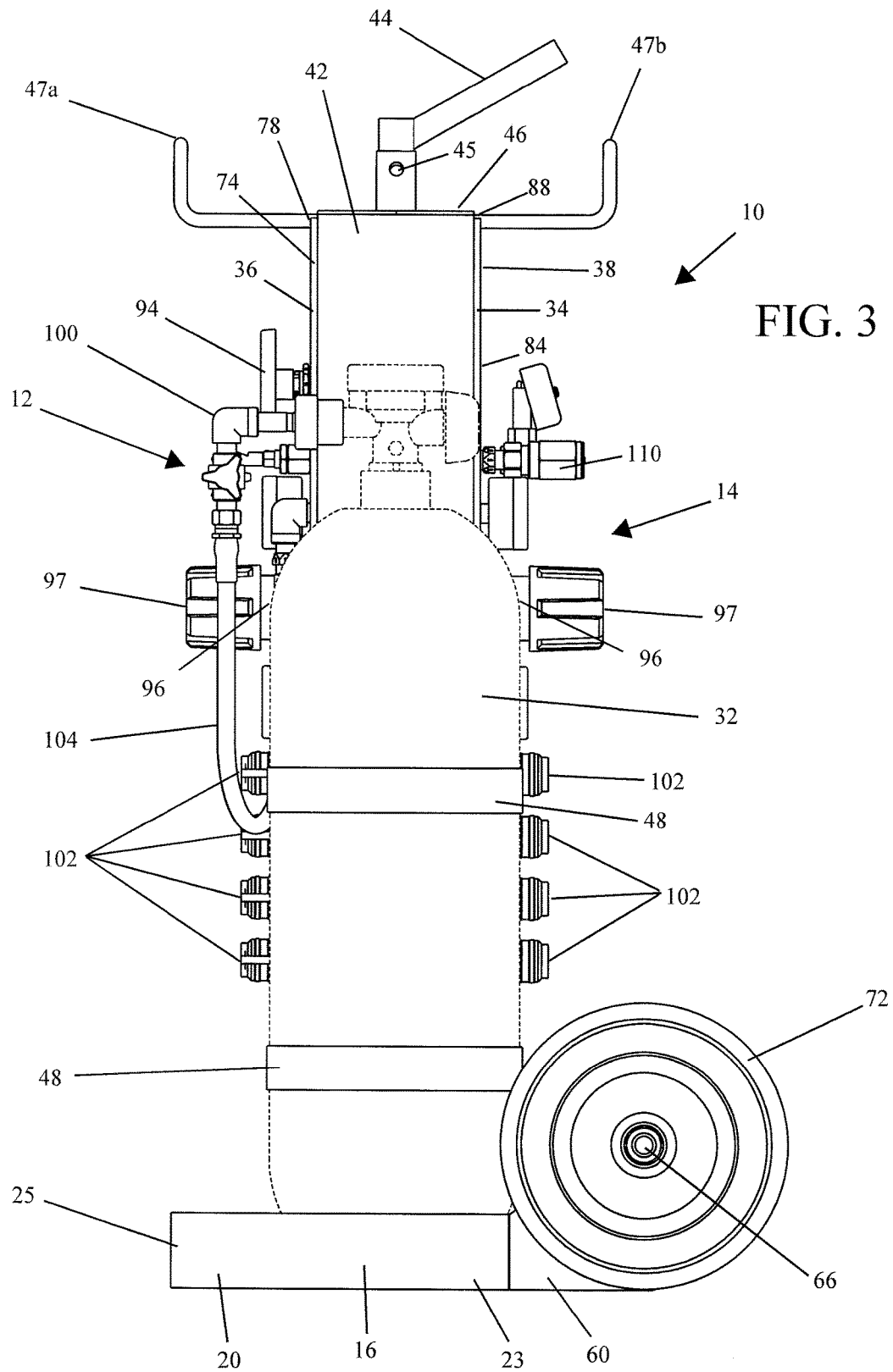
FIG. 3 is a side view of the air cylinder cart with gas cylinders.
Figure 4:
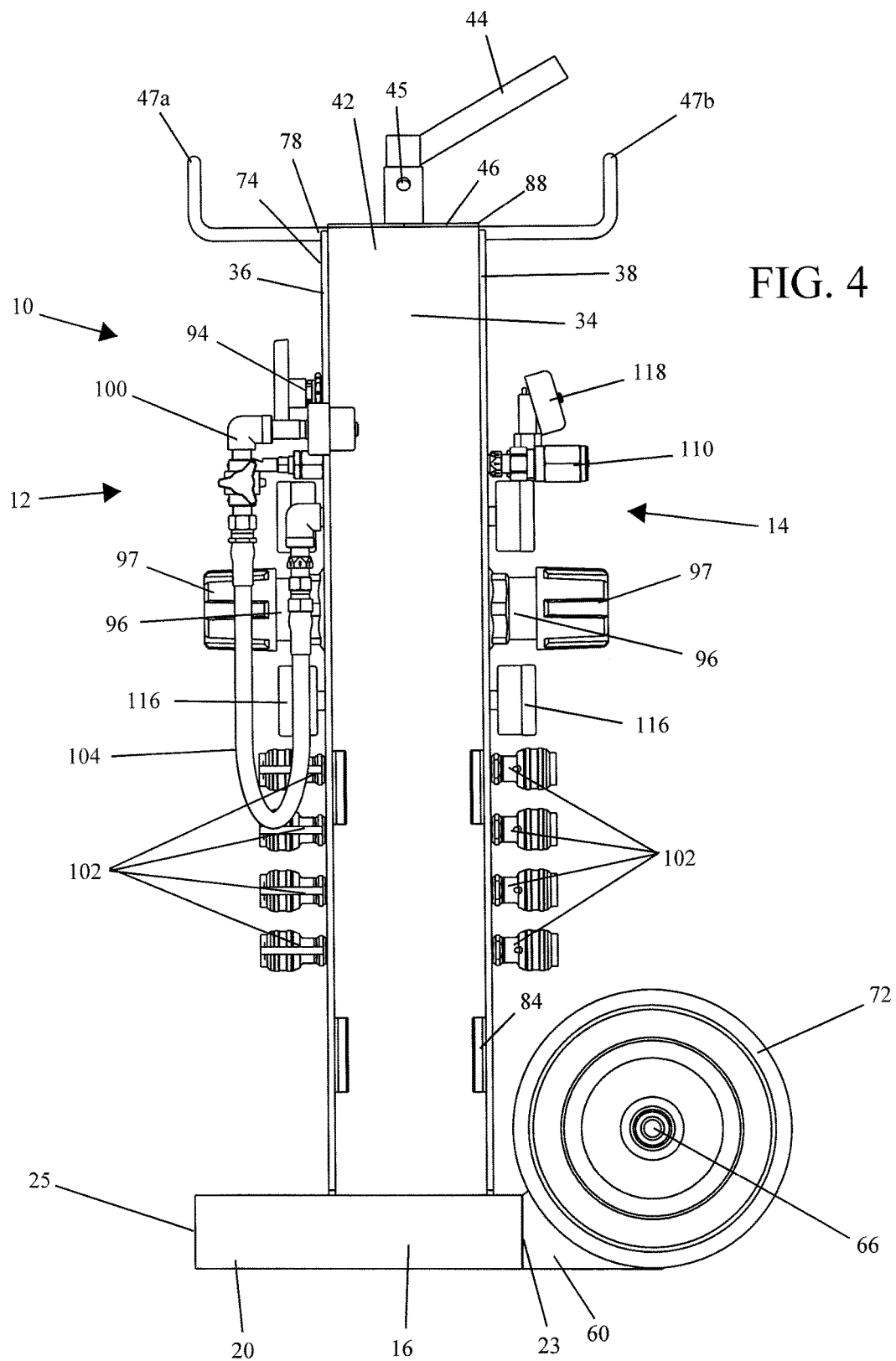
FIG. 4 is a side view of the air cylinder cart without gas cylinders.
Figure 5:
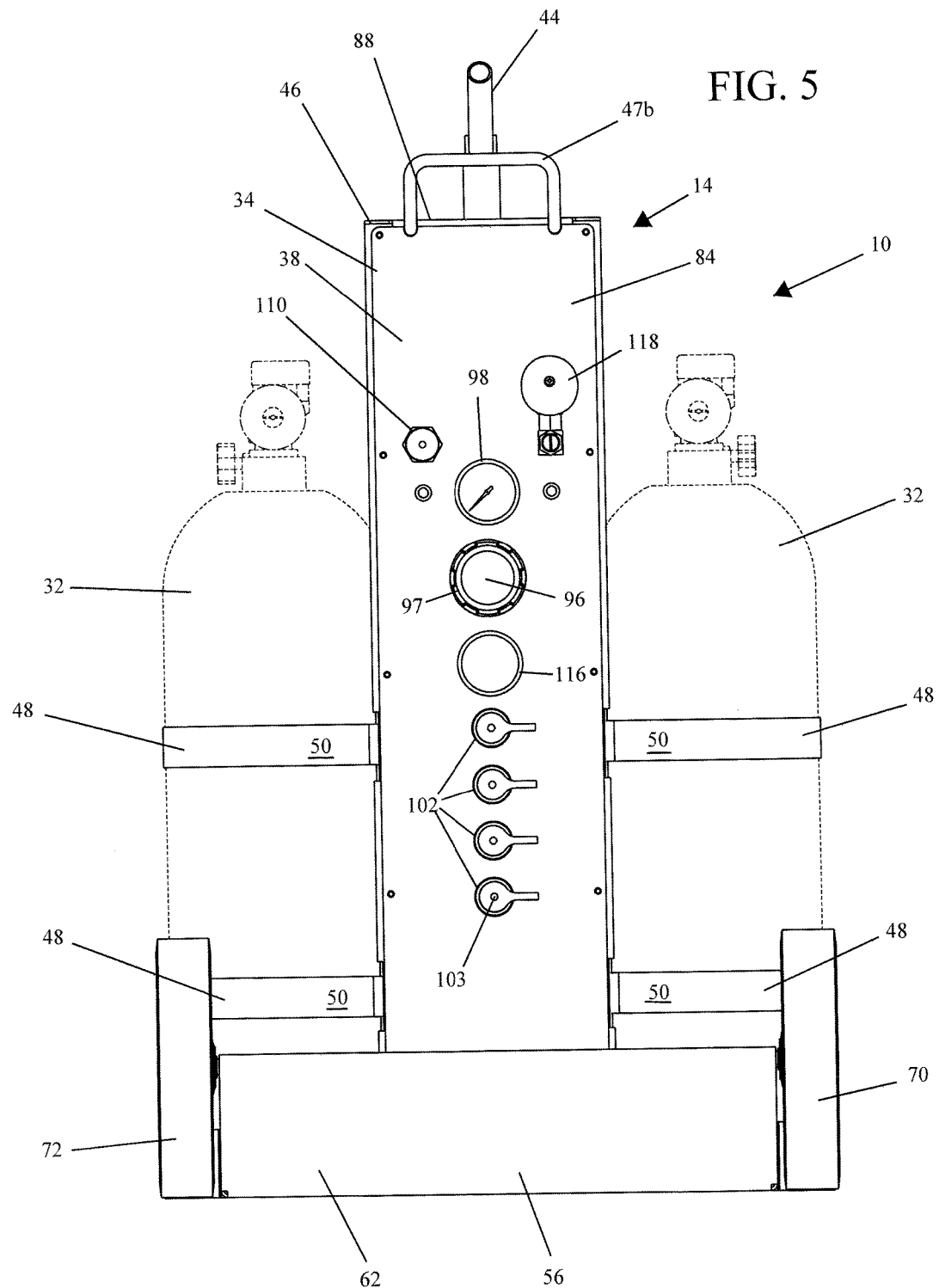
FIG. 5 is a rear view of the air cylinder cart with gas cylinders.
Figure 6:
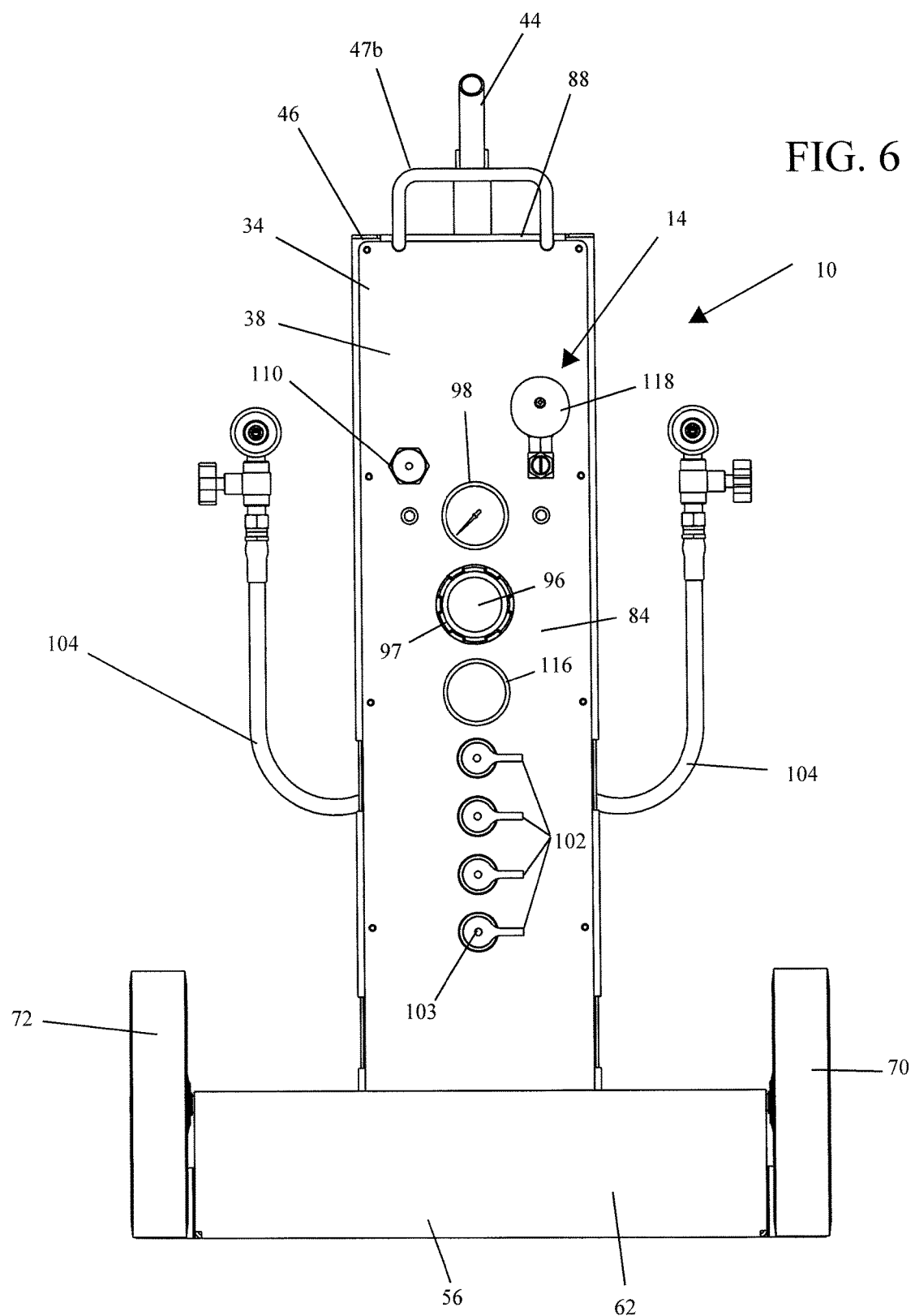
FIG. 6 is a rear view of the air cylinder cart without gas cylinders.
Figure 7:
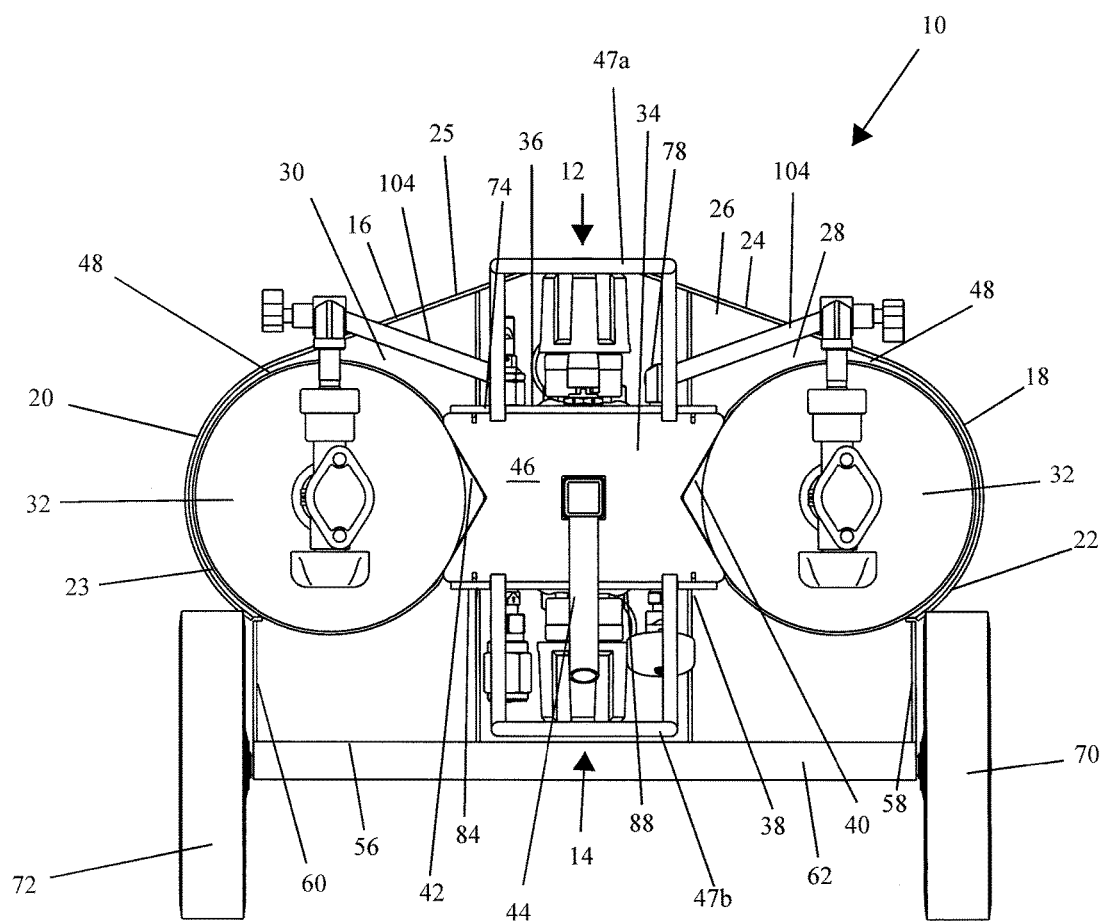
FIG. 7 is top plan view of the air cylinder cart with gas cylinders.
Figure 8:
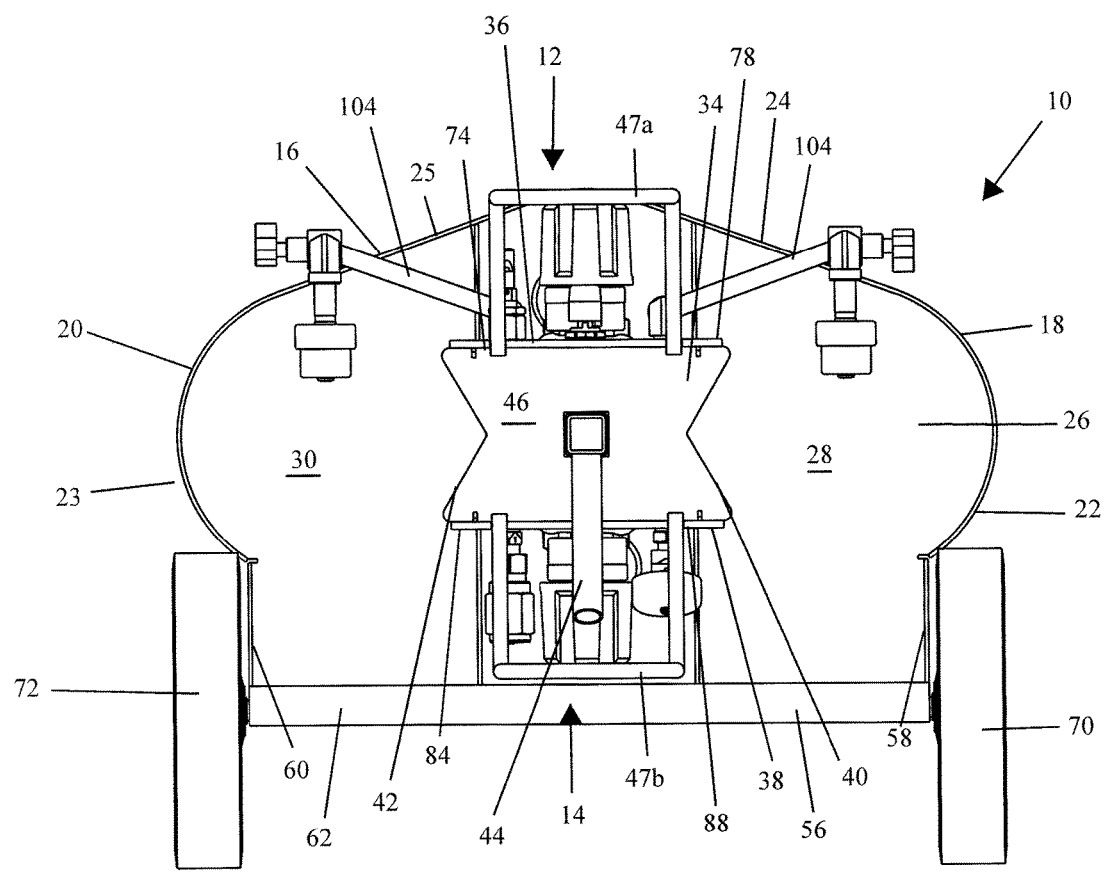
FIG. 8 is a top plan view of the air cylinder cart without gas cylinders.
Figure 9:
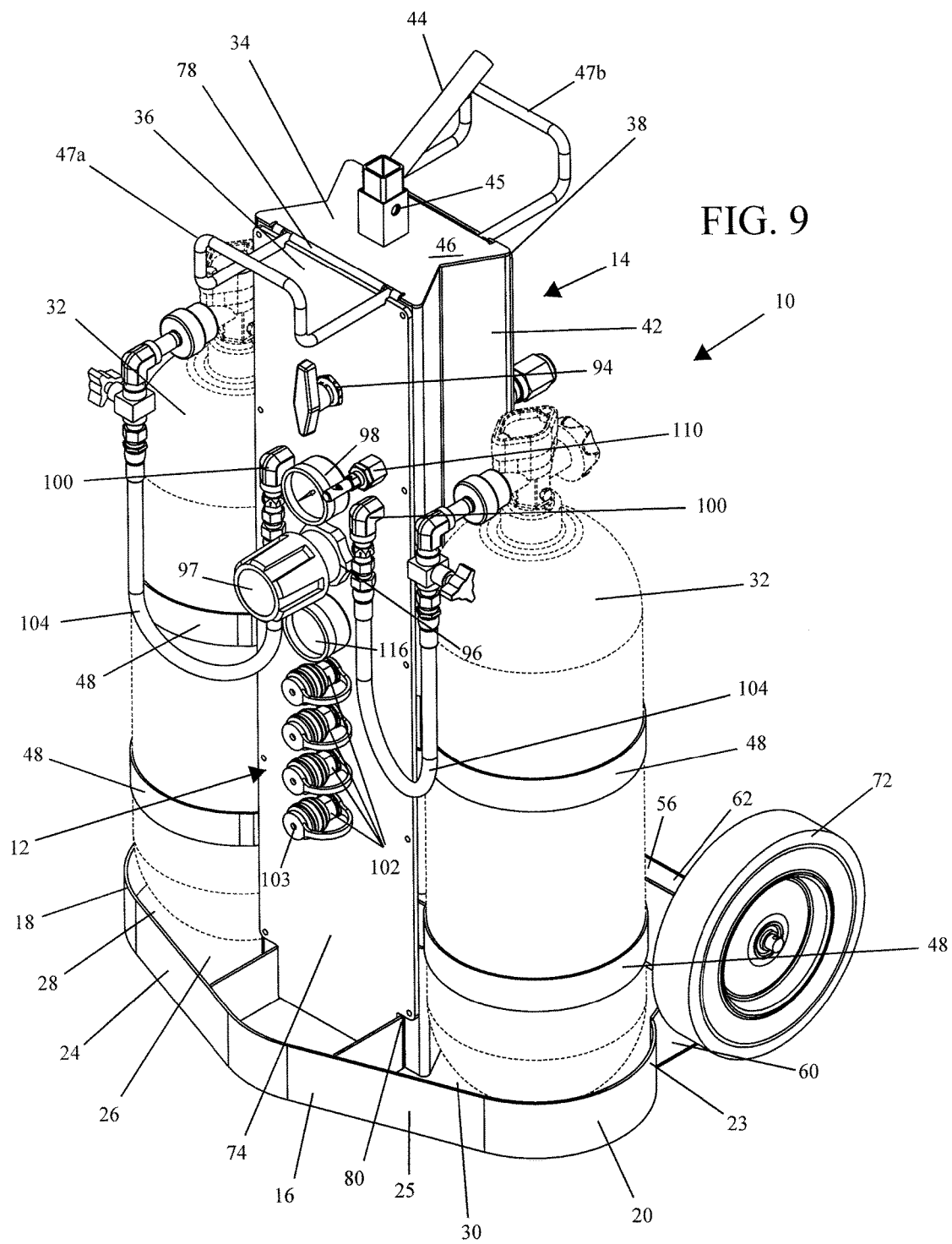
FIG. 9 is a perspective view of the air cylinder cart with gas cylinders.
Figure 10:
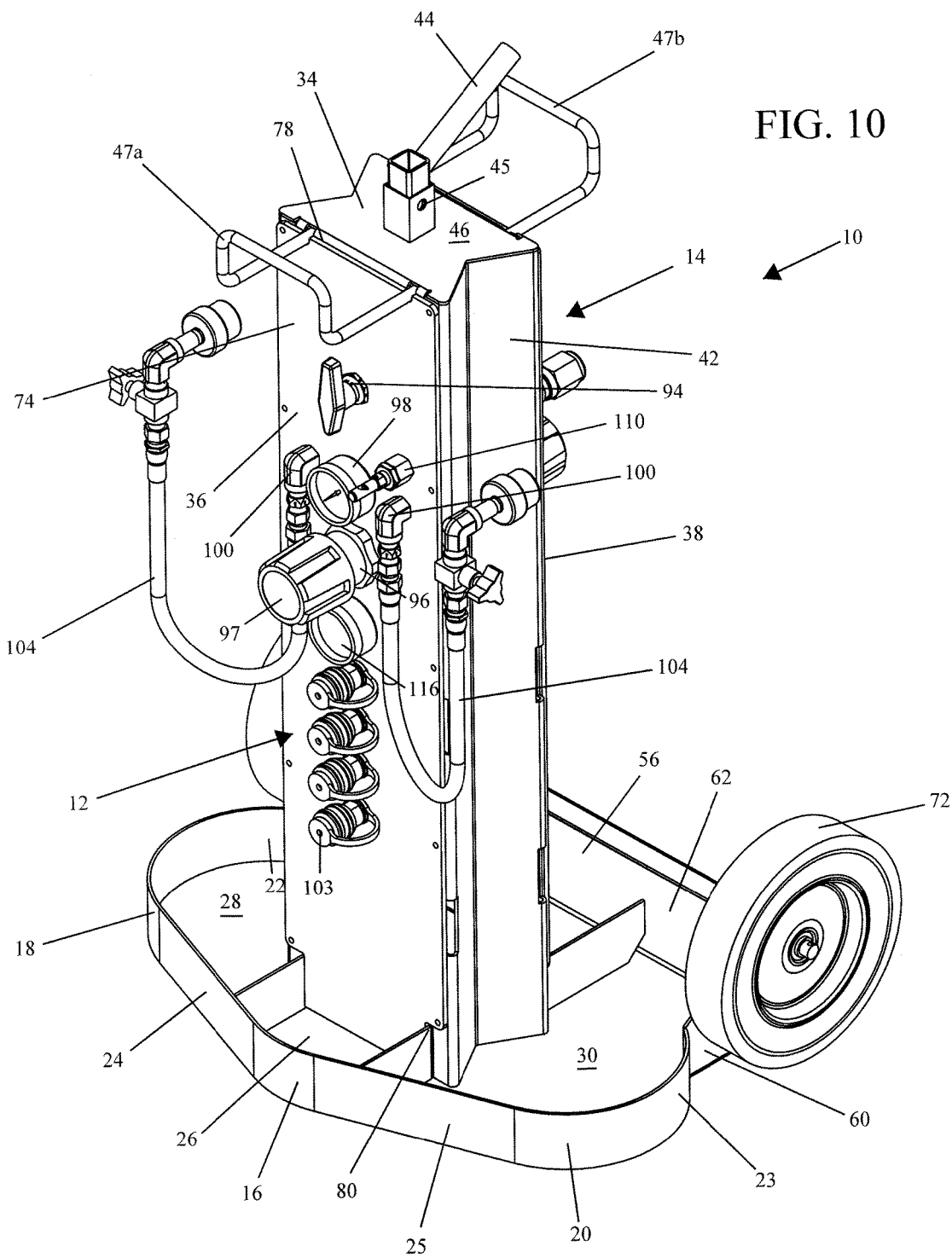
FIG. 10 is a perspective view of the air cylinder cart without gas cylinders.
Figure 11:
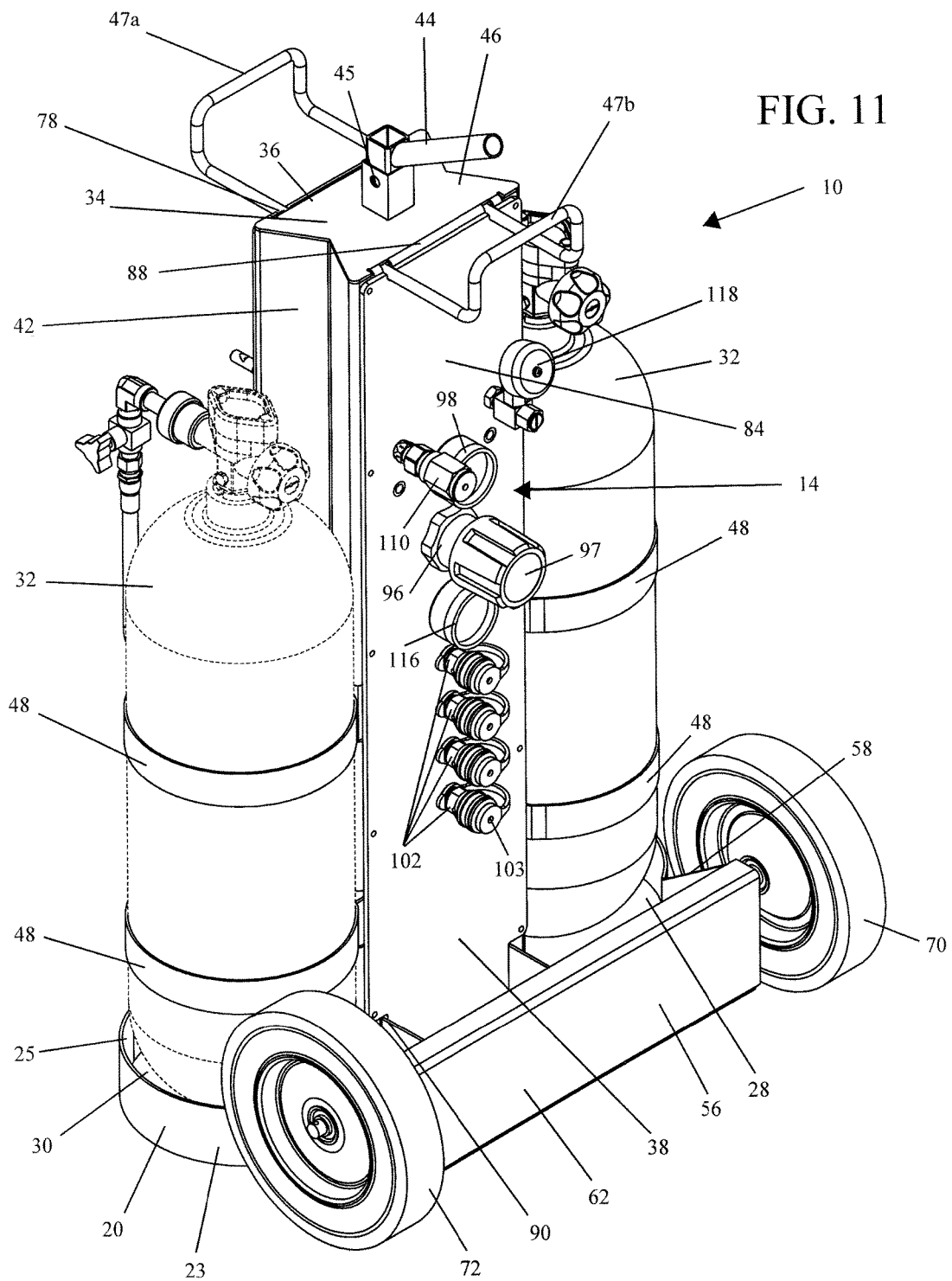
FIG. 11 is a rear perspective view of the air cylinder cart with gas cylinders.
Figure 12:
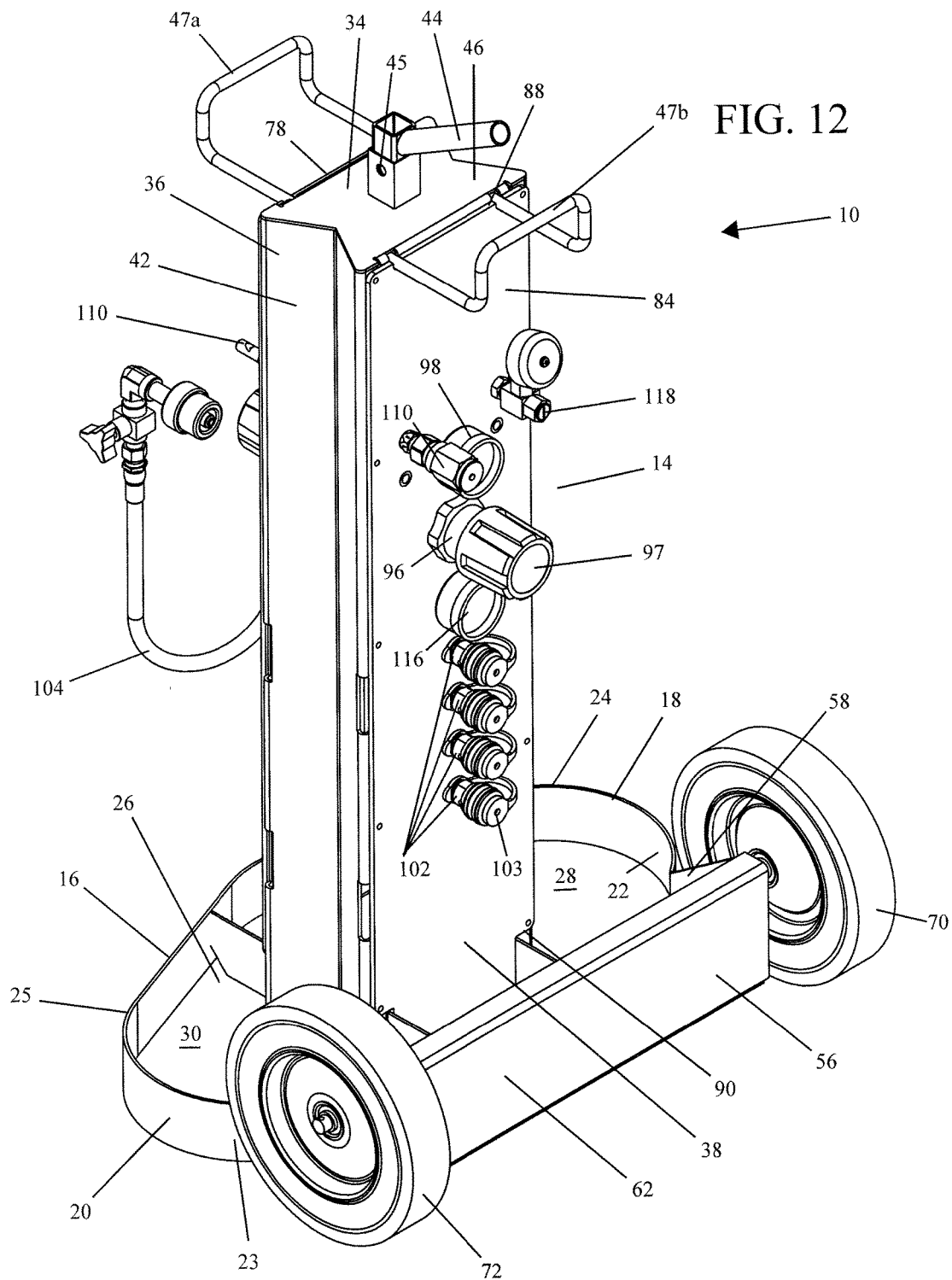
FIG. 12 is a rear perspective view of the air cylinder cart without gas cylinders.

Referring to FIGS. 1 through 12, a gas cylinder cart 10 in accordance with the present invention is disclosed. The gas cylinder cart 10 includes opposed control assemblies 12, 14 accommodating attachment to distinct systems that might require different control panels. Note that in addition to the gas cylinder cart 10 of the present invention accommodating a central manifold 15, each of the control assemblies 12, 14 can include one or more manifolds.

The gas cylinder cart 10 includes a frame 16, a first control assembly 12, and a second control assembly 14. The frame 16 includes a pair of opposite side support walls 18, 20, each having a rear support wall portion 22, 23 and a front support wall portion 24, 25, and a portion of the bottom support wall 26, otherwise referred to as a floor. The side support walls 18, 20 and bottom support wall 26 define a pair of gas cylinder bays 28, 30. Each of the first and second cylinder bays 28, 30 includes a recess shaped to receive a bottom portion of a gas cylinder 32. The term "bay" should be broadly understood to mean any compartment or location where the gas cylinder is received or located.

The frame 16 further comprises a central manifold tower 34 centered between the side support walls 18, 20. The central manifold tower 34 includes first and second control panel walls 36, 38, as well as first and second tower side walls 40, 42 respectively extending between the first and second control panel walls 36, 38. Each of the first and second tower side walls 40, 42 includes a curved portion having a concave surface that corresponds to and is shaped to mate with a gas cylinder 32 when it is positioned within either the first or second bay 28, 30.

A handle 44 is secured to the top end 46 of the central manifold tower 34. The handle 44 is telescopically adjustable and is under the control of a spring button release mechanism 45. The top end 46 of the central manifold tower 34 also includes first and second rigid projecting handles 47a, 47b. The projecting handles 47a, 47b extend in opposite directions, that is, toward the front and rear of the cart 10, so as to allow for access from either side of the cart 10 for either manual manipulation or support of hoses, cables and other structures.

The bottom support wall 26 of the frame 16 has a peripheral edge, which defines in part the footprint of the cart. The term "footprint" refers to the area occupied by the cylinder cart 10 superimposed on a planar surface when viewing the cart 10 from a top view.

The front support wall portion 24, 25 and the rear support wall portion 22, 23 of the side support wall 18, 20 include curved surfaces shaped and dimensioned for mating with the gas cylinder 32 when placed within the respective bays 28, 30. In accordance with a preferred embodiment, each side support wall 18, 20 and its inner surfaces, are continuous, and preferably define a recess shaped and dimensioned for accommodating the gas cylinder 32. Each side support wall 18, 20, includes the front support wall portion 24, 25 and the rear support wall portion 22, 23, also has and defines a continuous outer surface which is preferably convex. The outer surface of the side support wall 18, 20 along the front portion thereof preferably follows the peripheral edge of the bottom support wall 26 and further defines an outermost periphery and footprint of the gas cylinder cart 10.

The gas cylinder(s) 32 is preferably secured in one or both of the bays 28, 30 with strap(s) 48. The straps 48 extend from the first and second tower side walls 40, 42 and are shaped and dimensioned to wrap around the gas cylinder 32. As such, each strap 48 includes a first end 50 and a second end 52, wherein the first end 50 is fixedly secured to the first or second tower side wall 40, 42 and the second end 52 is selectively secured to a coupling member 54 along the first or second tower side wall 40, 42 after the remainder of the strap 48 has been positioned to encircle and restrain a gas cylinder 32 positioned within either the first or the second bay 28, 30. The straps 48 can be made from any suitable flexible material. For example, in one embodiment, the straps 48 are made of nylon, and include a quick-release latch, or other securing mechanism, such as a VELCRO® hook and loop material.

A support 56 extends rearward from the rear support wall portion 22, 23. The support 56 includes a pair of opposite side walls 58, 60 and a rear wall 62. Preferably, the side walls 58, 60 each have a bottom edge 64, 65, with the rear wall 62 extending between and connected to the respective bottom edges 64, 65 of the side walls 58, 60. Each side wall 58, 60 preferably includes a recess (or groove) 62, 64 formed on an upper edge thereof at the outer end of the side wall 58, 60. An axle 66 is disposed in the recess 62, 64 and is fixedly secured to the support 56, for example by welding. A pair of wheels 70, 72 is rotatably mounted on opposite ends of the axle 66. It should be understood that the axle could alternatively be rotatably mounted to the frame, with the wheels fixedly or rotatably mounted on the axle.

The wheels 70, 72 are preferably nested in corner recesses formed between the side support walls 58, 60 of the support 56 and the rear support wall portions 22, 23 of the side support walls 18, 20, such that the wheels 70, 72 preferably do not extend laterally beyond, or substantially beyond, the outermost lateral sides of the side support walls 18, 20. In this way, the footprint of the gas cylinder cart 10 is minimized and the wheels 70, 72 are shielded by the side support walls 18, 20 from interfering with various objects in the path of the cart.

The central manifold tower 34 includes first and second control panel walls 36, 38. The first control panel wall 36 includes an exposed surface 74, an interior surface 76, a top edge 78, and a bottom edge 80. The front first control panel wall 36 also includes a plurality of apertures (not shown) through which elements of the first gas distribution assembly 82 extend for access by a user of the present gas cylinder cart 10. It is appreciated the number and positioning of the apertures may be varied to suit specific needs and various manifolds that may be used in accordance with the present invention. Similarly, the rear second control panel wall 38 includes an exposed surface 84, an interior surface 86, a top edge 88, and a bottom edge 90. The second control panel wall 38 also includes a plurality of apertures (not shown) through which elements of the second gas distribution assembly 92 extend for access by a user of the present gas cylinder cart 10. As with the first control panel wall 36, it is appreciated the number and positioning of the apertures may be varied to suit specific needs and various manifolds that may be used in accordance with the present invention. With this in mind, and as the terms will be used in the present disclosure, the first control panel wall 36 and the first gas distribution assembly 82 constitute the first control assembly 12, while the rear second control panel wall 38 and the second gas distribution assembly 92 constitute the second control assembly 14.

The inclusion of first and second control assemblies 12, 14 within a single gas cylinder cart 10 allows for use of the present gas cylinder cart 10 in conjunction with different systems that might require different control assemblies. The versatility of the present gas cylinder cart 10 is further enhanced by the provision of the first and second control assemblies 12, 14 along the front and rear portions of the gas cylinder cart 10. Such positioning also provides for the versatility necessary to accommodate the needs of different systems requiring gas. In addition, and as disclosed in Applicant's own U.S. Pat. No. 6,733,017, entitled "GAS CYLINDER CART WITH REMOVABLE CONTROL PANEL" and U.S. Pat. No. 7,419,169, entitled "INTERCHANGEABLE CONTROL PANELS FOR GAS CYLINDER CART," it may be possible and desirable to allow for interchangeable control panels, and as such U.S. Pat. Nos. 6,733,017 and 7,419,169 are incorporated herein to the extent the disclosure is relevant to the present invention.

Figure 13:
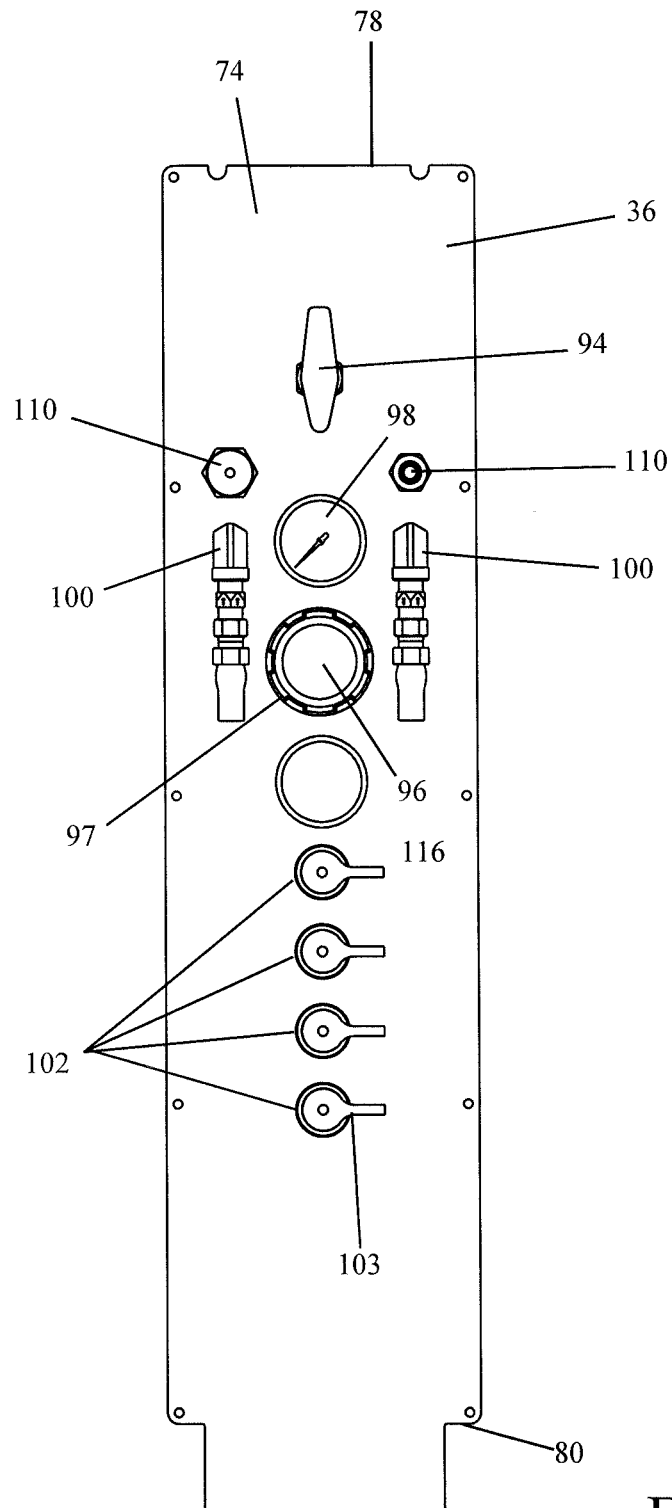
FIG. 13 is a front view of the first control assembly, including the first control panel wall.
Figure 14:
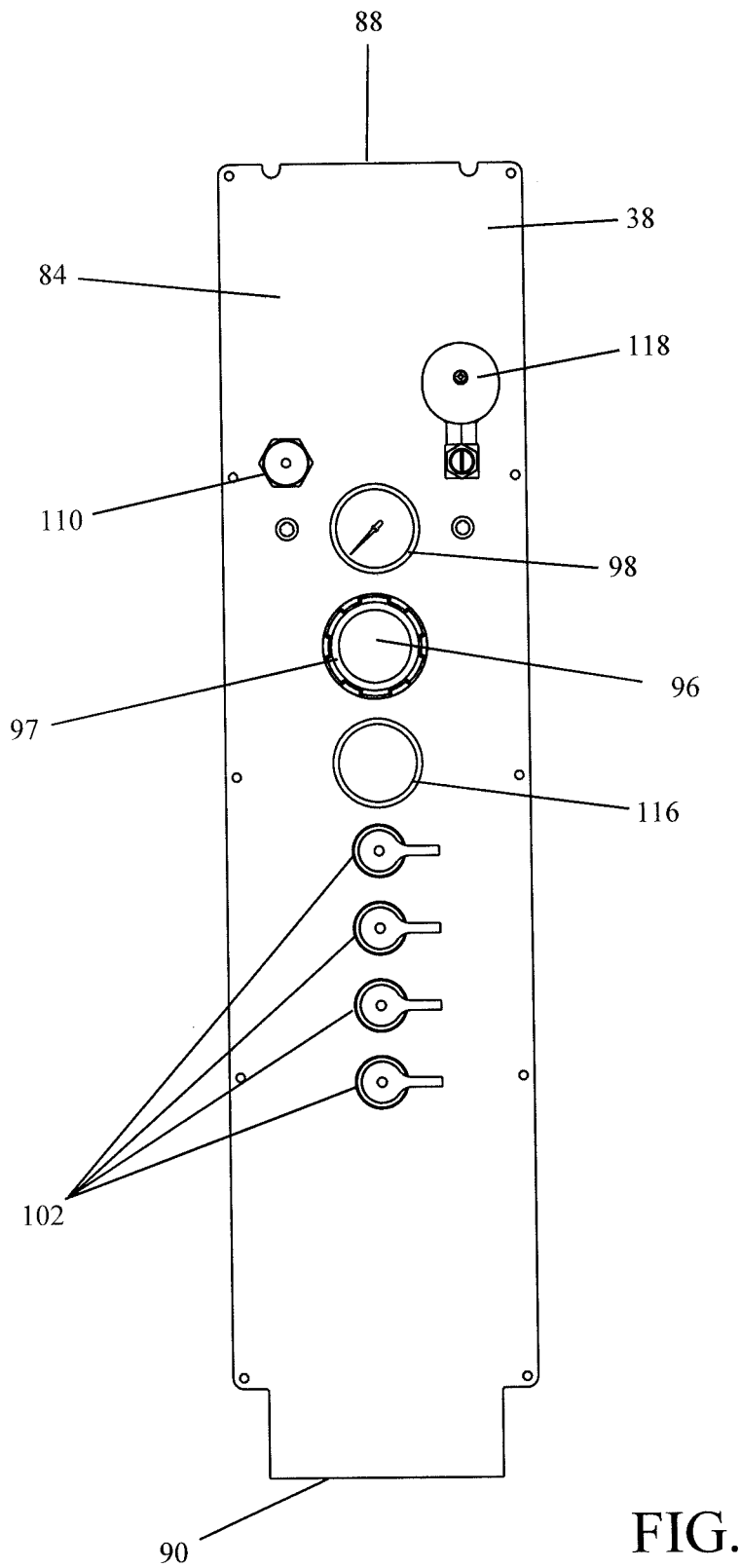
FIG. 14 is a front view of the second control assembly, including the second control panel wall.
Figure 15:
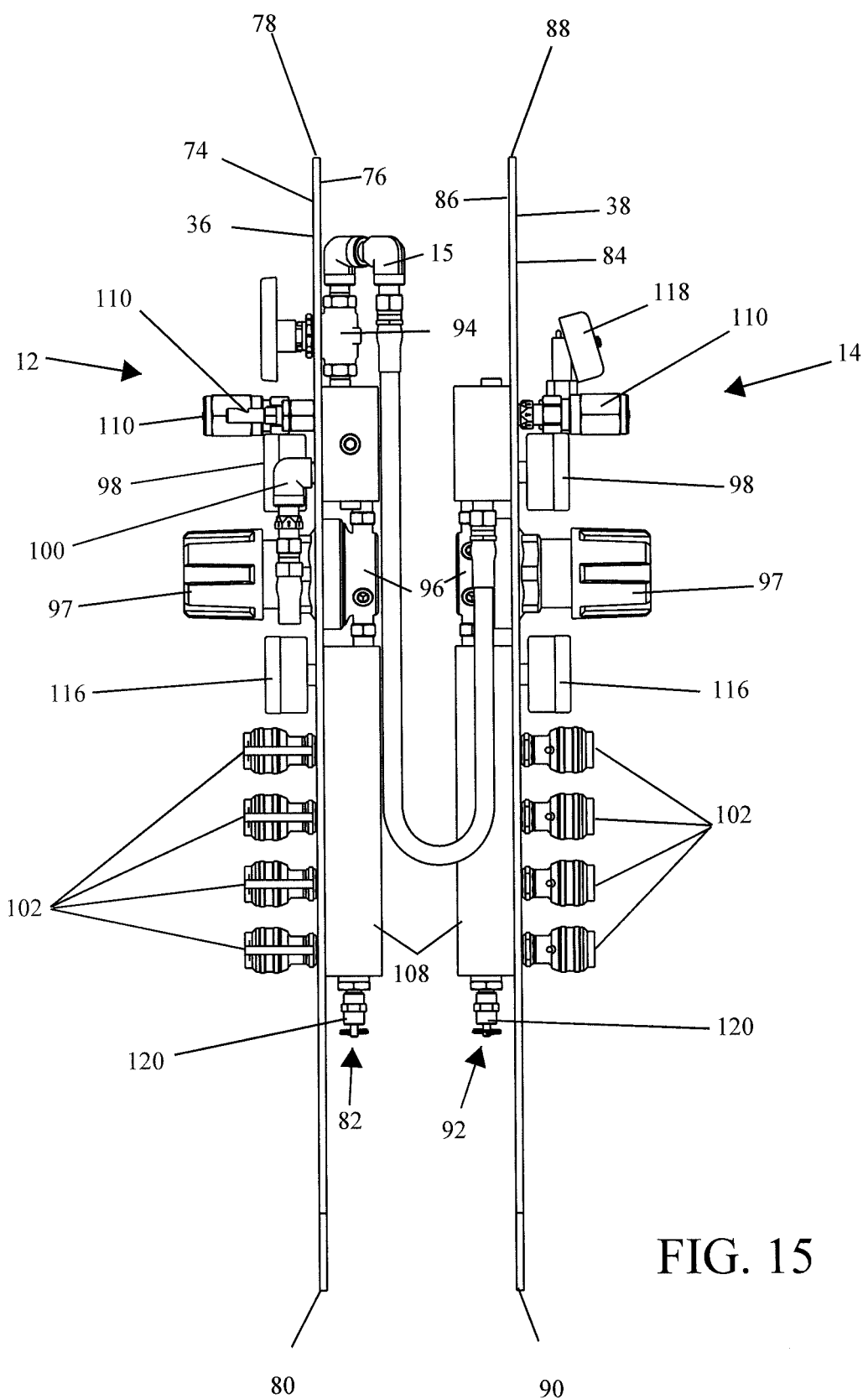
FIG. 15 is a side view of the first and second control assemblies, a central manifold, and exemplary connections therebetween.
Figure 16:
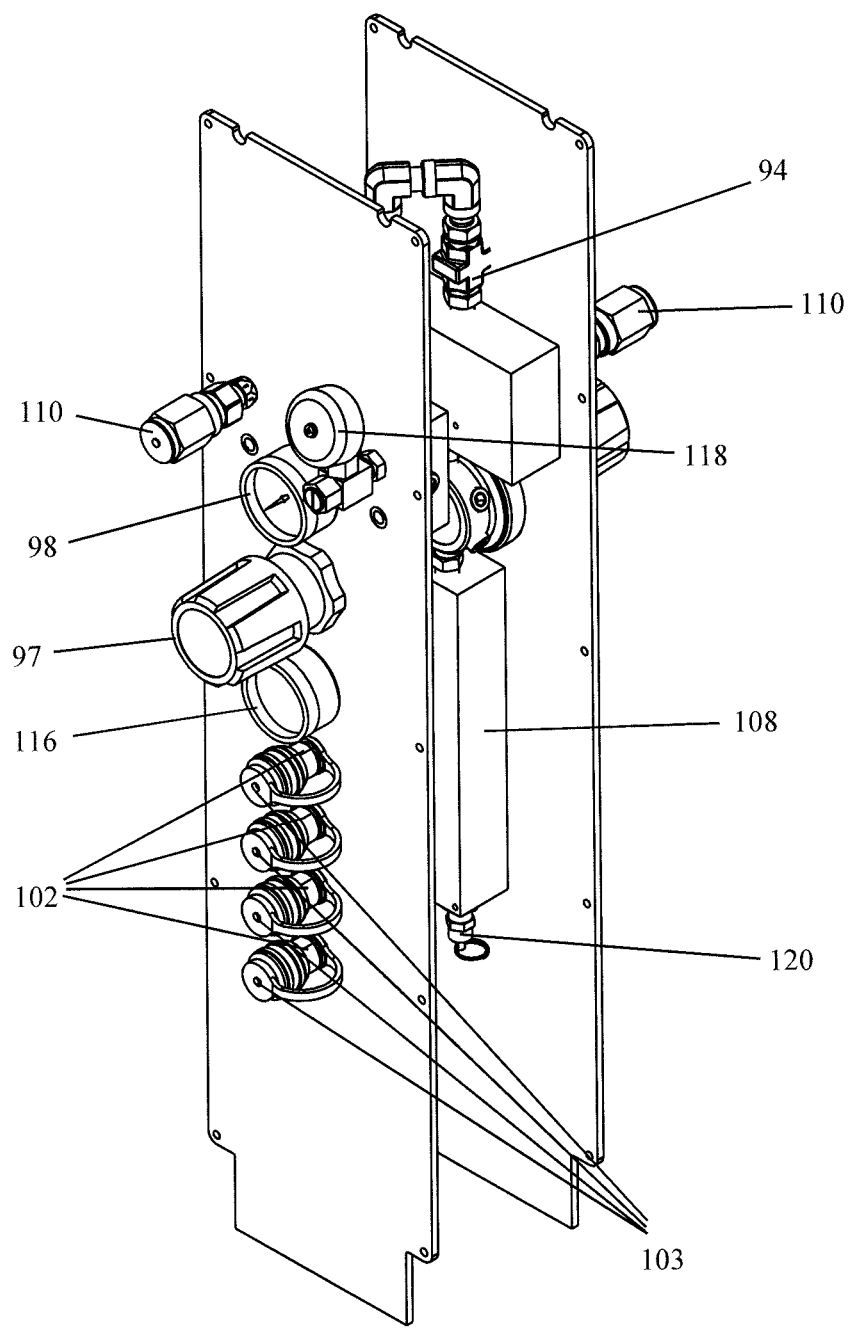
FIG. 16 is a perspective view of the first and second control assemblies of FIG. 15 from the second control assembly side.
Figure 17:
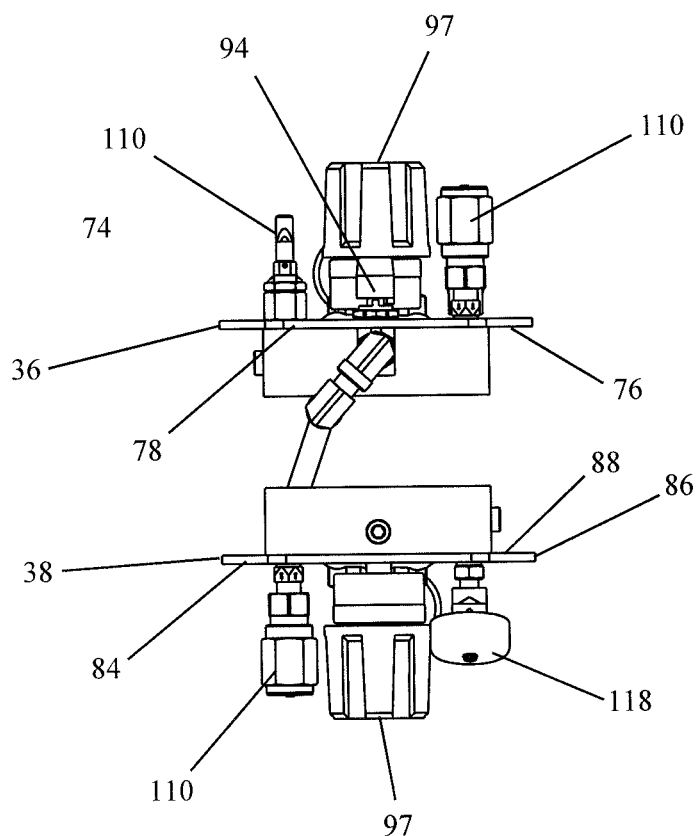
FIG. 17 is a top view of the first and second control assemblies of FIG. 15.
Figure 18:
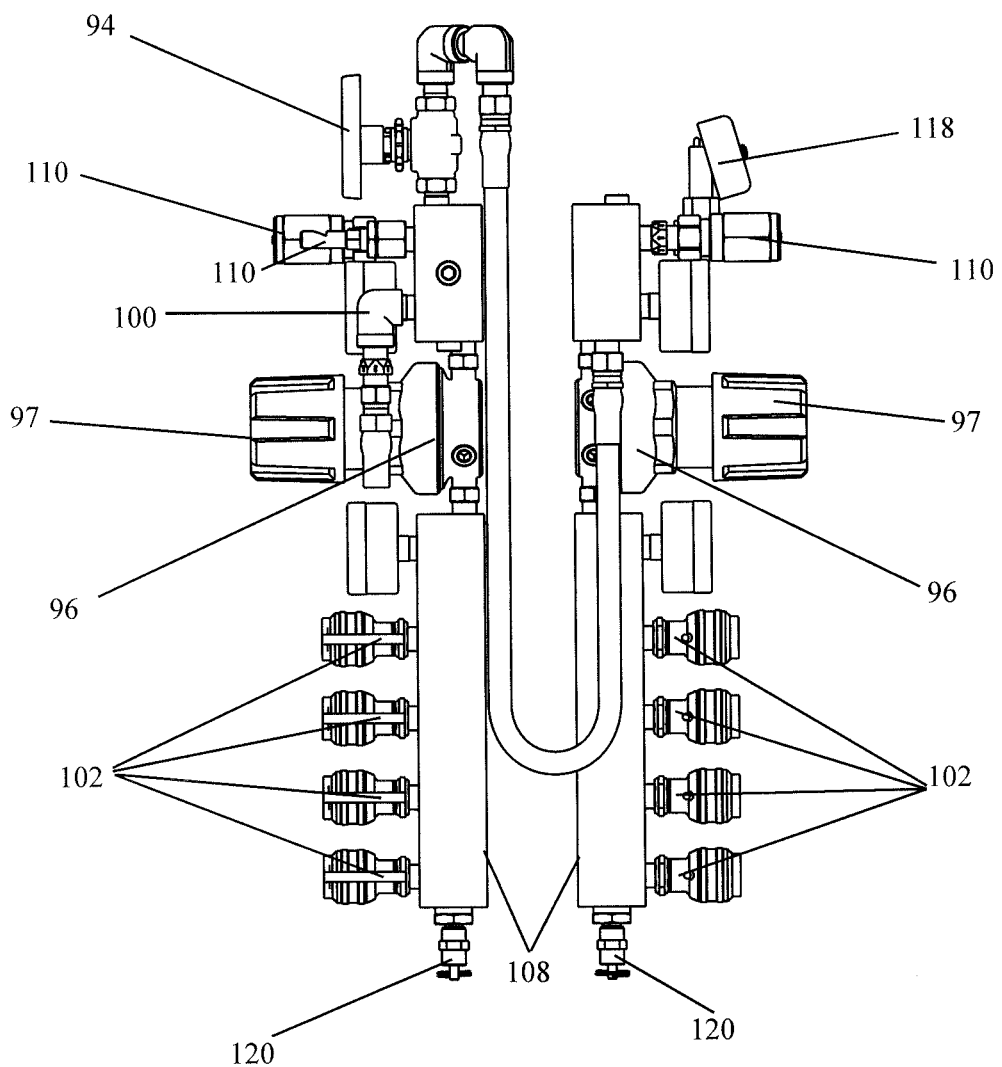
FIG. 18 is a side view of the first and second control assemblies of FIG. 15 with the first and second control panel walls removed.
Figure 19:
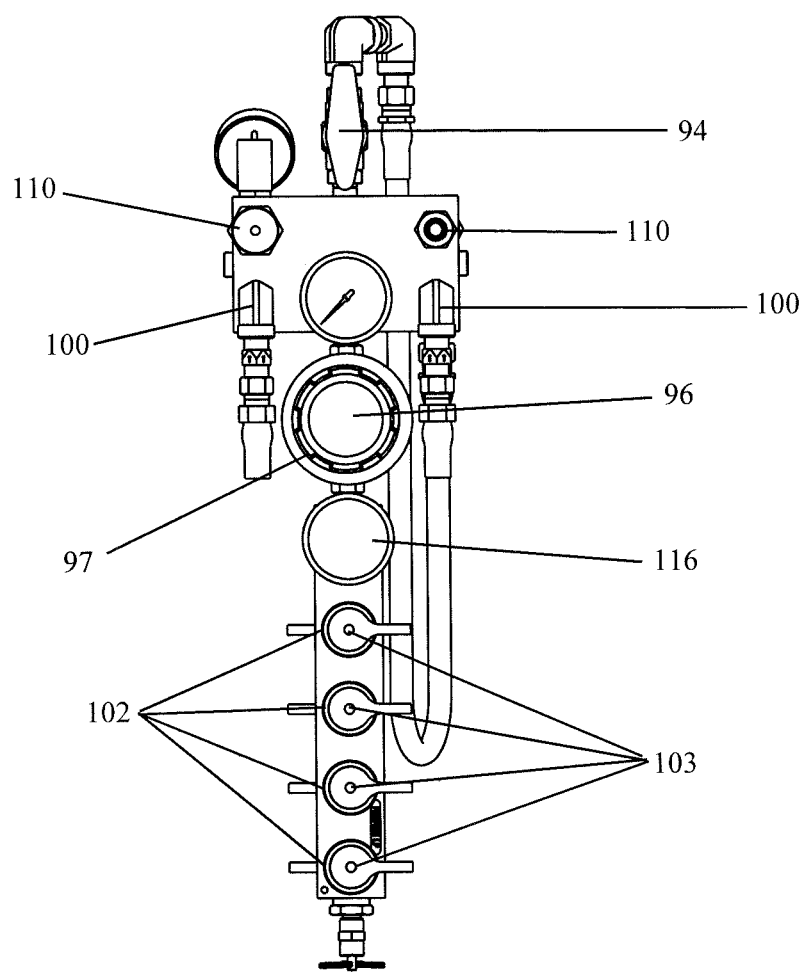
FIG. 19 is a front view of the first control assembly with the first control panel wall removed.
Figure 20A:
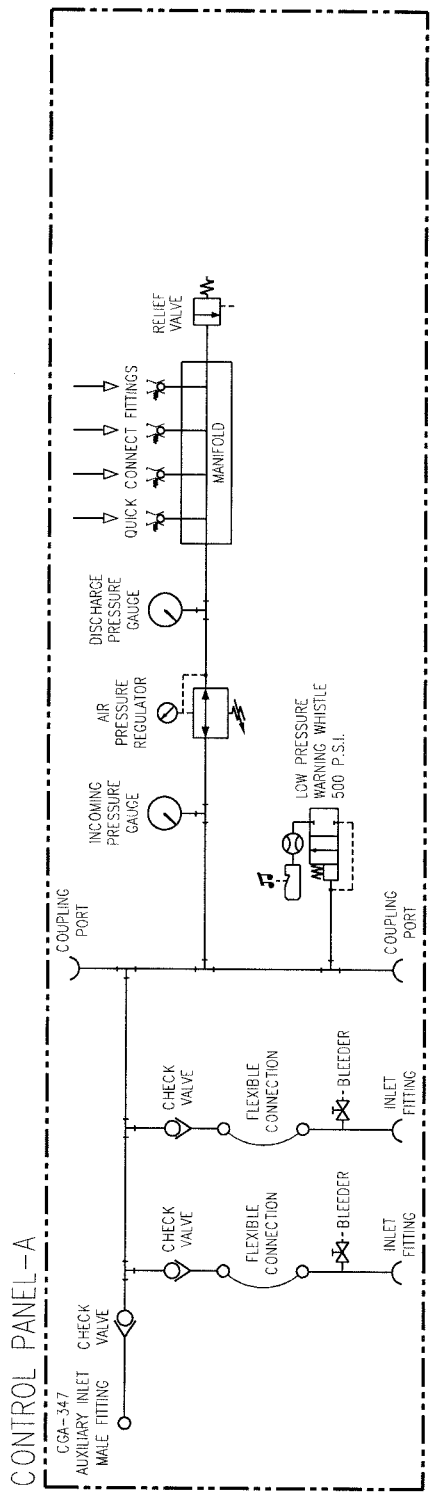
FIGS. 20A, 20B, 20C, 20D, 20E, and 20F are exemplary control assembly schematics including various mechanisms for controlling the flow of gas through the present system. These control panels may be utilized in tandem in various arrangements as either the first control assembly and/or the second control assembly.
Figure 20B:
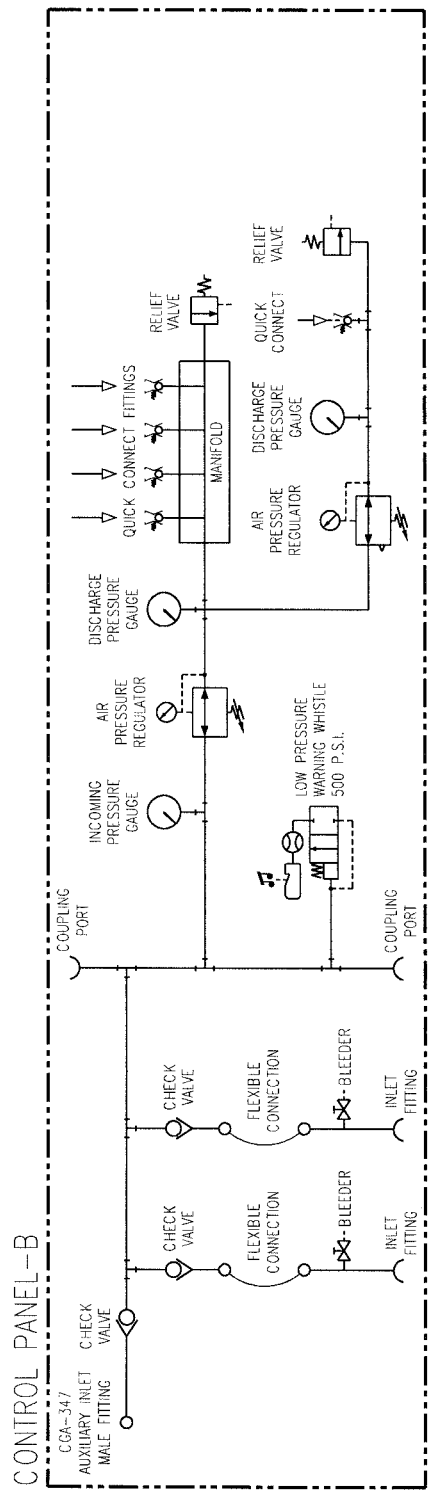
Figure 20C:
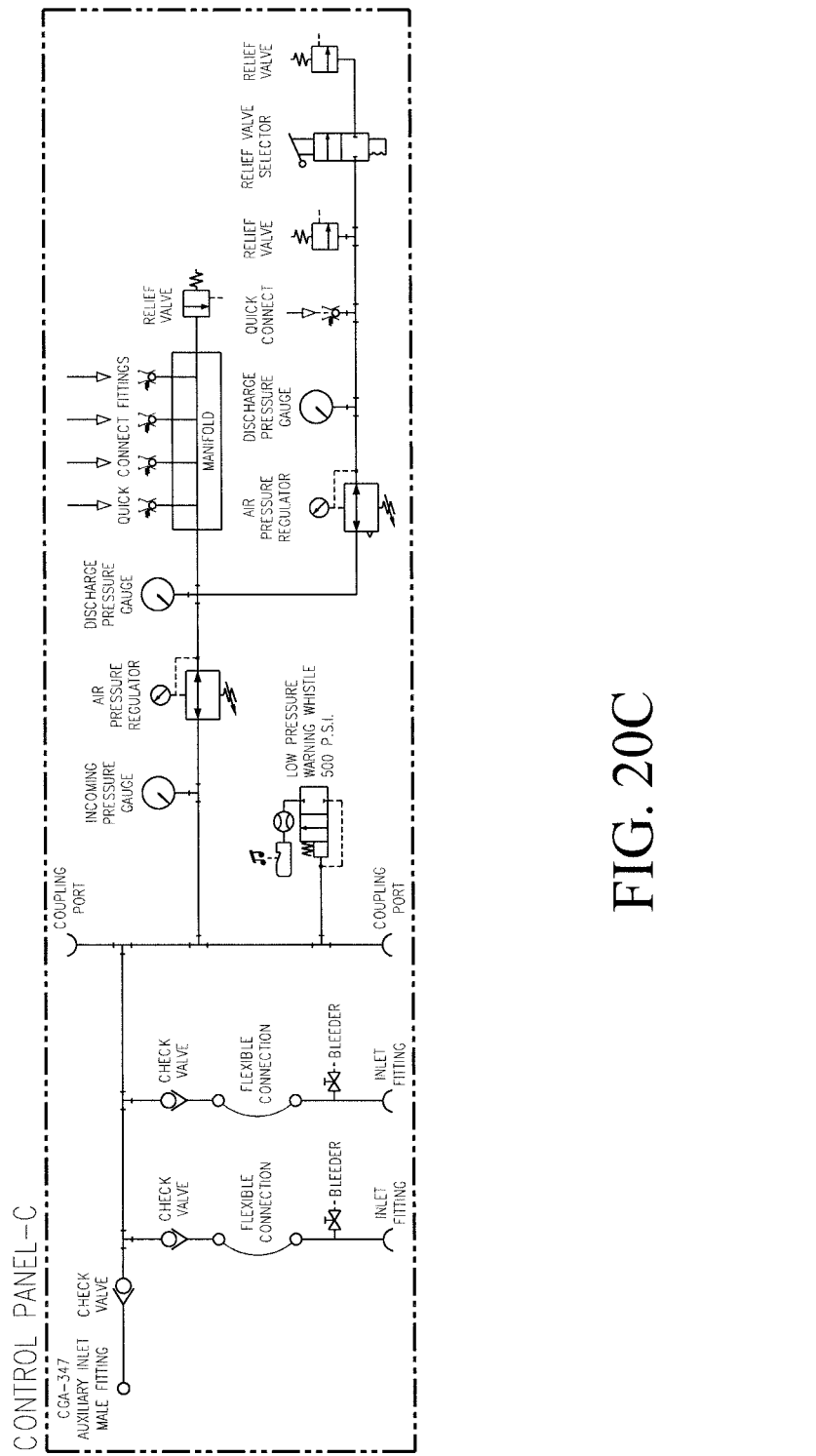
Figure 20D:
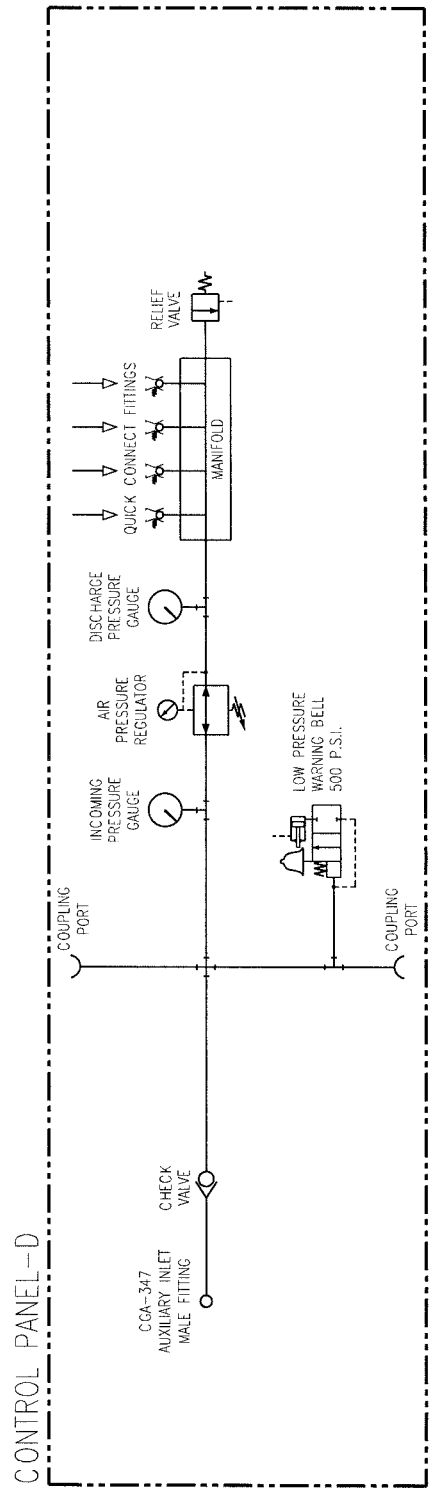
Figure 20E:
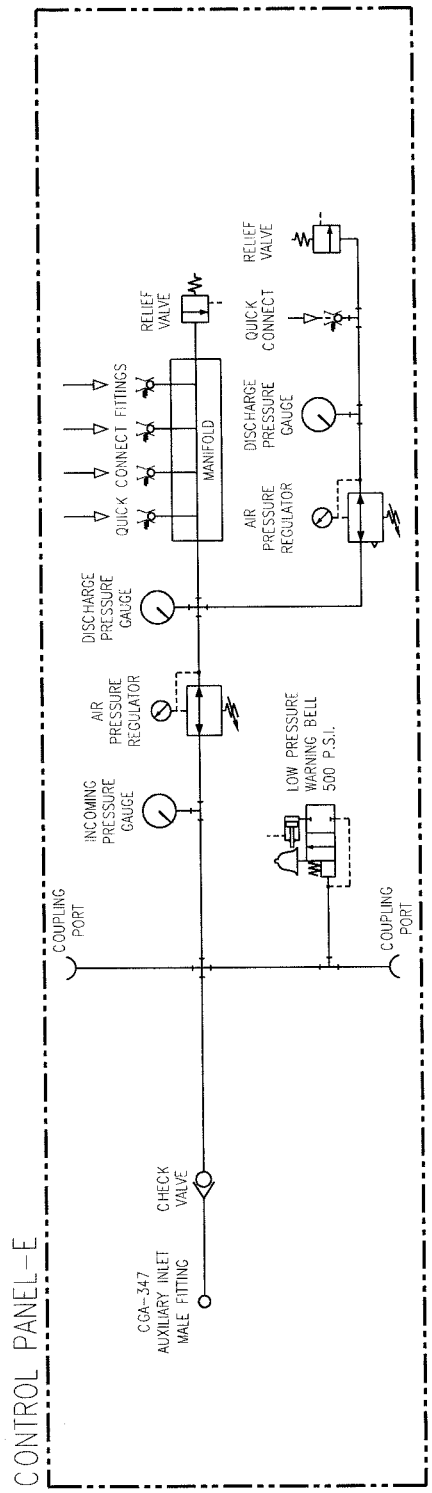
Figure 20F:
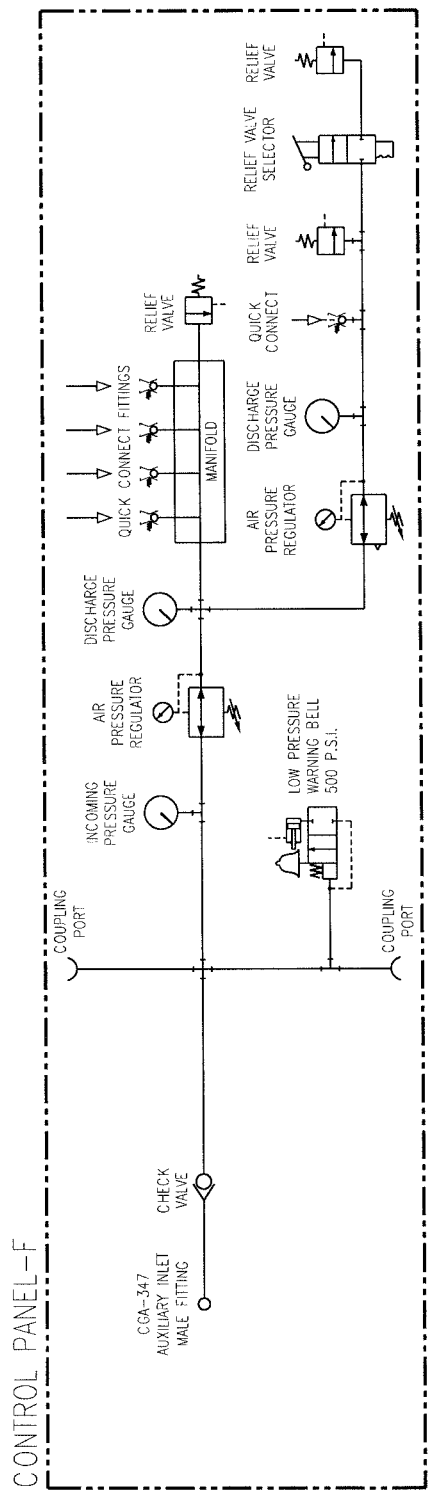

In general, and as will be explained below in greater detail with particular reference to FIGS. 13-19, each of the first and second control assemblies 12, 14 is attached to the gas cylinders 32 via a valve assembly 94 of the central manifold 15 allowing for the connection of both the first and second control assemblies 12, 14 to the gas cylinders 32, connection of only one of the first and second control assemblies 12, 14 to the gas cylinders 32, or connection of the first and/or second control assemblies 12, 14 to remote gas sources. Although alternate control assemblies are contemplated in accordance with the present invention, each of the control assemblies 12, 14 includes at least one of a gas control device (or pressure regulator) 96, gas monitoring device (for example, gas gauge) 98, gas inlet port(s) 100, gas outlet port(s) 102, and gas line(s) 104. Each control assembly 12, 14 preferably also includes one or more devices such as a manifold 108 for distribution or receipt of gases to or from different ports, a visual warning device 116, an auditory warning device 118, and a pressure relief valve 120. Preferably, outlet ports 102 and gas lines 104 are fitted with quick connect and release fittings.

Preferably, the frame, and its various components, the control panel and the handle are made of steel. However, it should be understood that the various components can be made of other rigid materials known to the those skilled in the art, including for example and without limitation, other types of metal, such as aluminum or titanium, hard plastic and/or fiberglass composites. In one preferred embodiment, the material, such as steel, can be powder coated, or alternatively can be treated and/or painted so as to increase its resistance to wear and corrosion.

The first and second control assemblies 12, 14 may be configured with different configurations or arrangements of various gas control devices, which means any device or component employed to regulate, monitor or otherwise control the flow of gas from the gas cylinder to the end user, and which may include without limitation, various gauges, pressures regulators, manifolds, warning devices, valves, switches, pressure regulator controls and outlet and inlet ports. For example, the control assemblies 12, 14 are each configured with one or more gas outlet ports 102, through which the gas is released to the user, for example and without limitation as breathing air, tool air or welding gas. The outlet ports 102 preferably are configured as quick connect sockets and include dust caps 103, which can be removably secured on the end of the outlet port 102. In particular, the user couples a supply line to the outlet port 102, which is connected to an outlet or distribution manifold. The supply line is then connected to an air operated device, such as a breathing apparatus or pneumatic tool. The pressure at which the gas is released through the outlet ports 102 is controlled by one or more pressure regulators 96, which are also preferably connected to or mounted on the control assemblies 12, 14. The pressure regulators 96 can be mounted on the inner surface of the front and rear control panel walls 36, 38 such that they are maintained in the cavity defined by central manifold tower 34, wherein they are protected. The pressure regulators 96 are controlled by one or more pressure regulator controls 97, shown as including a knob.

Preferably, the first and second gas distribution assemblies 82, 92 are made of metal, such as aluminum, although it should be understood that they can be made of other materials. In this way, the user can alter the pressure of the gas being released to the user through the outlet port 102. For example, breathing air can be regulated and provided to the end user at a pressure of between about 0 and about 125 psi and preferably at about 100 psi or below. Similarly, tool air can be regulated and provided to the end user at a pressure of between about 0 and about 300 psi, and preferably at about 250 psi or below. One or more pressure relief valves 120 can also be connected or integrated into the first and second gas distribution assemblies 82, 92.

The first and second control assemblies 12, 14 may also be controlled to include an auxiliary inlet port 110 by which gas is supplied via the control assemblies 12, 14 from a source independently situated from the gas cart 10. The auxiliary inlet port 110 is intended to be connected to an auxiliary tank or gas cylinder not secured in one of the bays, although it should be understood that it could also be operably connected to one of the gas cylinders 32 in the bays. For example, a tank on a fire engine holding a large volume of pressurized gas can be connected to the auxiliary inlet port 110 and can be thereafter regulated using the control devices arranged on the control assemblies 12, 14. By use of appropriate valves and manifolds, it is possible in an embodiment to recharge (i.e., refill) gas cylinders 32 which are still mounted upon the cart.

The first and second control assemblies 12, 14 are each also preferably configured with one or more pressure gauges 98, which indicate the pressure at which gas is being released through the outlet ports 102. In addition, one or more gauges can indicate the pressure of the gas contained in the gas cylinders 32, or in an auxiliary tank.

While the preferred embodiments have been shown and described, it will be understood that there is no intent to limit the invention by such disclosure, but rather, it is intended to cover all modifications and alternate constructions falling within the spirit and scope of the invention.

The invention claimed is:

1. A gas cylinder cart, comprising:
a frame including first and second gas cylinder bays and a central manifold tower centered between the first and second gas cylinder bays, the central manifold tower including a first control panel wall and a second control panel wall, as well as first and second tower side walls respectively extending between the first and second control panel walls;
a central manifold, a first gas distribution assembly, and a second gas distribution assembly supported within the central manifold tower, the first gas distribution assembly being covered by the first control panel wall and the second gas distribution assembly being covered by the second control panel wall, wherein the central manifold is connected to each of the first and second gas distribution assemblies, the central manifold includes a valve assembly allowing for connection of both the first and second gas distribution assemblies to gas cylinders, connection of only one of the first and second gas distribution assemblies to gas cylinders, or connection of the first and/or second gas distribution assemblies to remote gas sources;
wherein inclusion of the first and second gas distribution assemblies within the gas cylinder cart allows for use of the gas cylinder cart in conjunction with different systems that might require different control assemblies.

2. A gas cylinder cart, comprising:
a frame including a pair of opposite side support walls, each of the pair of opposite side support walls having a rear support wall portion and a front support wall portion, and a portion of a bottom support wall, the side support walls and the bottom support wall defining first and second as cylinder bays, the frame further comprises a central manifold tower centered between the side support walls;
a first control assembly composed of a first control panel wall and a first gas distribution assembly;
a second control assembly composed of a second control panel wall and a second gas distribution assembly; and
a central manifold connected to each of the first and second control assemblies, the central manifold includes a valve assembly allowing for connection of both the first and second control assemblies to gas cylinders, connection of only one of the first and second control assemblies to gas cylinders, or connection of the first and/or second control assemblies to remote gas sources;
wherein inclusion of the first and second control assemblies within the gas cylinder cart allows for use of the gas cylinder cart in conjunction with different systems that might require different control assemblies;
wherein the central manifold tower includes the first and second control panel walls, as well as first and second tower side walls respectively extending between the first and second control panel walls.

3. The gas cylinder cart according claim 2, wherein each of the first and second control assemblies includes at least one of a gas control device, a gas monitoring device, a gas inlet port, a gas outlet port, and a gas line.

4. The gas cylinder cart according claim 3, wherein each first and second control assemblies includes at least one of a manifold for distribution or receipt of gases to or from different ports, a visual warning device, an auditory warning device, and a pressure relief valve.

5. The gas cylinder cart according claim 2, wherein the first and second gas distribution assemblies are made of metal.

6. The gas cylinder cart according claim 2, wherein each of the first and second control assemblies includes at least one of a gas control device, a gas monitoring device, a gas inlet port, a gas outlet port, and a gas line.

7. The gas cylinder cart according claim 6, wherein each first and second control assemblies includes at least one of a manifold for distribution or receipt of gases to or from different ports, a visual warning device, an auditory warning device, and a pressure relief valve.

8. The gas cylinder cart according claim 2, wherein a support extends rearward from the rear support wall portion, and an axle with a pair of wheels rotatably mounted thereon is secured to the support.

9. The gas cylinder cart according claim 2, wherein each of the first and second cylinder bays includes a recess shaped to receive a gas cylinder.

10. The gas cylinder cart according claim 2, wherein the frame comprises a central manifold tower centered between the side support walls.

11. The gas cylinder cart according claim 2, wherein each of the first and second tower side walls includes a curved portion having a concave surface that corresponds to and is shaped to mate with a gas cylinder when positioned within either the first or second gas cylinder bay.

12. The gas cylinder cart according claim 2, wherein the first control panel wall includes an exposed surface, an interior surface, a top edge, and a bottom edge, and the second control panel wall includes an exposed surface, an interior surface, a top edge, and a bottom edge.

* * * * *